US012087966B2

(12) United States Patent
Kim et al.

(10) Patent No.: US 12,087,966 B2
(45) Date of Patent: Sep. 10, 2024

(54) SEPARATOR FOR RECHARGEABLE BATTERY AND LITHIUM RECHARGEABLE BATTERY COMPRISING SAME

(71) Applicant: Samsung SDI Co., Ltd., Yongin-si (KR)

(72) Inventors: Jinwoo Kim, Suwon-si (KR); Jihyun Chun, Suwon-si (KR); Daehyun Hong, Suwon-si (KR); Imhyuck Bae, Suwon-si (KR); Sangho Lee, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 930 days.

(21) Appl. No.: 17/059,974

(22) PCT Filed: Apr. 26, 2019

(86) PCT No.: PCT/KR2019/005093
§ 371 (c)(1),
(2) Date: Nov. 30, 2020

(87) PCT Pub. No.: WO2019/231113
PCT Pub. Date: Dec. 5, 2019

(65) Prior Publication Data
US 2021/0218109 A1   Jul. 15, 2021

(30) Foreign Application Priority Data
May 31, 2018 (KR) .......................... 10-2018-0063000

(51) Int. Cl.
*H01M 50/42* (2021.01)
*B01D 69/12* (2006.01)
*B01D 71/02* (2006.01)
*B01D 71/26* (2006.01)
*B01D 71/40* (2006.01)
*H01M 10/0525* (2010.01)
*H01M 50/417* (2021.01)
*H01M 50/426* (2021.01)
*H01M 50/443* (2021.01)
*H01M 50/449* (2021.01)
(Continued)

(52) U.S. Cl.
CPC ........ *H01M 50/42* (2021.01); *B01D 69/1212* (2022.08); *B01D 69/1213* (2022.08); *B01D 71/024* (2013.01); *B01D 71/261* (2022.08); *B01D 71/262* (2022.08); *B01D 71/403* (2022.08); *H01M 10/0525* (2013.01); *H01M 50/417* (2021.01); *H01M 50/426* (2021.01); *H01M 50/443* (2021.01); *H01M 50/449* (2021.01); *H01M 50/491* (2021.01); *H01M 50/489* (2021.01)

(58) Field of Classification Search
CPC ............ H01M 50/42; H01M 10/0525; H01M 50/417; H01M 50/426; H01M 50/443; H01M 50/449; H01M 50/491; H01M 50/489; H01M 50/446; H01M 50/457; H01M 50/434; H01M 50/451; H01M 50/431; H01M 50/46; H01M 10/052; B01D 69/1212; B01D 69/1213; B01D 71/024; B01D 71/261; B01D 71/262; B01D 71/403; B01D 71/025; B01D 71/32; B01D 71/26; B01D 69/148; B01D 71/34; B01D 71/40; B01D 69/12; Y02E 60/10
See application file for complete search history.

(56) References Cited

U.S. PATENT DOCUMENTS

| | | | | |
|---|---|---|---|---|
| 5,504,133 A | * | 4/1996 | Murouchi | ................ C08K 3/22 252/511 |
| 2014/0030578 A1 | * | 1/2014 | Hoshiba | .................. B32B 5/022 429/144 |

(Continued)

FOREIGN PATENT DOCUMENTS

| CN | 103579561 A | 2/2014 |
|---|---|---|
| CN | 104910818 A | 9/2015 |

(Continued)

OTHER PUBLICATIONS

First office action dated Jul. 6, 2022 in Chinese patent application No. 201980045777.0.
(Continued)

*Primary Examiner* — Muhammad S Siddiquee
(74) *Attorney, Agent, or Firm* — Knobbe, Martens, Olson & Bear, LLP (57) ABSTRACT

This application relates to a separator for a rechargeable battery. The separator includes a porous substrate and a coating layer on at least one surface of the porous substrate. The coating layer includes a binder including a fluorine-based binder and a (meth)acryl-based binder, and a filler. The fluorine-based binder includes a first structural unit derived from vinylidene fluoride and a second structural unit derived from at least one monomer of hexafluoropropylene, chlorotrifluoroethylene, trifluoroethylene, ethylene tetrafluoride, and ethylene monomers, and the second structural unit is included in an amount of 10 wt % or less with respect to the fluorine-based binder. The fluorine-based binder includes a first fluorine-based binder having a weight average molecular weight of 800,000 to 1,500,000 and a second fluorine-based binder having a weight average molecular weight of less than or equal to 600,000. The (meth)acryl-based binder has pencil hardness of 5H or higher.

20 Claims, 2 Drawing Sheets

(51) Int. Cl.
*H01M 50/491* (2021.01)
*H01M 50/489* (2021.01)

(56) References Cited

U.S. PATENT DOCUMENTS

| | | | | |
|---|---|---|---|---|
| 2015/0200395 A1* | 7/2015 | Stevanovic | ............ | H01M 4/136 |
| | | | | 429/163 |
| 2017/0256768 A1* | 9/2017 | Yoo | ..................... | H01M 4/623 |
| 2017/0338460 A1 | 11/2017 | Kim et al. | | |
| 2019/0013504 A1* | 1/2019 | Choi | ................. | H01M 10/0525 |

FOREIGN PATENT DOCUMENTS

| | | |
|---|---|---|
| CN | 107394090 A | 11/2017 |
| GB | 1376535 A | 12/1974 |
| KR | 10-2014-0147742 A | 12/2014 |
| KR | 10-2015-0068711 A | 6/2015 |
| KR | 10-2015-0083725 A | 7/2015 |
| KR | 10-1618681 B1 | 5/2016 |
| KR | 10-2016-0069385 A | 6/2016 |
| KR | 10-2017-0025434 A | 3/2017 |
| KR | 10-2017-0075493 A | 7/2017 |
| KR | 10-2017-0129452 A | 11/2017 |

OTHER PUBLICATIONS

International Search Report and Written Opinion dated Aug. 6, 2019, received in PCT/KR2019/005093 filed on Apr. 26, 2019.
Dent, Oct. 2011, GPC/SEC Practical Tips and Tricks, presentation, Gulf Coast Conference, 38 pp.
Extended European Search Report dated Feb. 10, 2022 in corresponding application No. 19812378.8, 9 pp.

* cited by examiner

SEPARATOR FOR RECHARGEABLE BATTERY AND LITHIUM RECHARGEABLE BATTERY COMPRISING SAME

CROSS-REFERENCE TO RELATED APPLICATIONS

This application is a national phase of PCT Application No. PCT/KR2019/005093, filed on Apr. 26, 2019, which claims priority to Korean Patent Application No. 10-2018-0063000 filed on May 31, 2018, each of which is hereby incorporated by reference.

TECHNICAL FIELD

A separator for rechargeable battery and a rechargeable lithium battery including the same are disclosed.

BACKGROUND ART

A separator for an electrochemical battery is an intermediate film that separates a positive electrode and a negative electrode in a battery, and maintains ion conductivity continuously to enable charge and discharge of a battery. A separator for a rechargeable battery is required to have physical properties such as adhesive force, heat resistance, and durability. A number of techniques have been reported to improve wet adhesive force, which is adhesive force in a state in which an electrolyte is added to a battery.

In recent years, in the case of large-sized batteries of the stack type, dry adhesive force, which is an adhesive force in the state in which the electrolyte is not added to the battery, is required. Therefore, it is necessary to develop a separator that not only has improved wet adhesive force and heat resistance, but also improved dry adhesive force.

DISCLOSURE

Technical Problem

A separator for rechargeable battery having improved heat resistance, wet adhesive force and dry adhesive force is provided.

In addition, a rechargeable lithium battery having improved heat resistance, durability, cycle-life characteristics, and safety is provided.

Technical Solution

In an embodiment, a separator for a rechargeable battery includes a porous substrate and a coating layer on at least one surface of the porous substrate, wherein the coating layer includes a binder including a fluorine-based binder and a (meth)acryl-based binder and a filler,
the fluorine-based binder includes a first structural unit derived from vinylidene fluoride and a second structural unit derived from at least one monomer of hexafluoropropylene, chlorotrifluoroethylene, trifluoroethylene, ethylene tetrafluoride, and ethylene monomers and 10 wt % or less of the second structural unit is included based on the fluorine-based binder,
the fluorine-based binder includes a first fluorine-based binder having a weight average molecular weight of 800,000 to 1,500,000 and a second fluorine-based binder having a weight average molecular weight of less than or equal to 600,000, and
the (meth)acryl-based binder has pencil hardness of 5H or higher.

In another embodiment, a rechargeable lithium battery includes a positive electrode, a negative electrode, and the separator for the rechargeable battery between the positive electrode and the negative electrode.

Advantageous Effects

The separator for the rechargeable battery has improved heat resistance, wet adhesive force and dry adhesive force, and a rechargeable lithium battery including the same has improved properties such as heat resistance, durability, cycle-life characteristics, and stability.

MODE FOR INVENTION

Hereinafter, embodiments of the present invention are described in detail. However, these embodiments are exemplary, the present invention is not limited thereto and the present invention is defined by the scope of claims.

Figure 1:
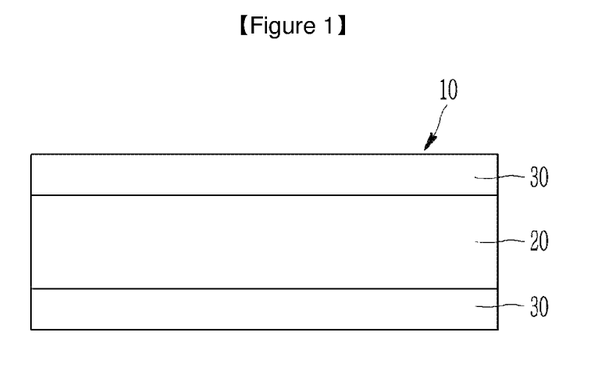
FIG. 1 is a view showing a separator for a rechargeable battery according to an embodiment.

Hereinafter, a separator for a rechargeable battery according to an embodiment is described. FIG. 1 is a view showing a separator for a rechargeable battery according to an embodiment. Referring to FIG. 1, a separator 10 for a rechargeable battery according to an embodiment includes a porous substrate 20 and a coating layer 30 disposed on one surface or both surfaces of the porous substrate 20.

The porous substrate 20 may have a plurality of pore and may generally be a porous substrate used in an electrochemical device. Non-limiting examples of the porous substrate 20 may be a polymer film formed of a polymer selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene, or a mixture of two or more.

The porous substrate 20 may be for example a polyolefin-based substrate, and the polyolefin-based substrate may improve has safety of a battery due to its improved shut-down function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 20 may have a thickness of about 1 μm to 40 μm, for example 1 μm to 30 μm, 1 μm to 20 μm, 5 μm to 15 μm, or 5 μm to 10 μm.

The coating layer 30 includes a binder and a filler.

The binder may play a role of fixing the filler on the porous substrate 20 and simultaneously, impart an adhesion force to the porous substrate 20 on one surface of the coating layer 30 and an electrode on the other surface thereof.

The binder includes a fluorine-based binder and a (meth) acryl-based binder.

The fluorine-based binder may include a first structural unit derived from vinylidene fluoride and a second structural unit derived from at least one monomer of hexafluoropropylene, chlorotrifluoroethylene, trifluoroethylene, ethylene tetrafluoride, and ethylene monomers.

The fluorine-based binder may be in various forms, such as an alternating polymer in which the structural units are alternately distributed, a random polymer in which the structural units are randomly distributed, or a graft polymer in which some structural units are grafted. In addition, the fluorine-based binder may be a linear polymer, a branched polymer, or a mixture thereof.

The first structural unit may be included in an amount of 90 wt % to 99.5 wt %, for example 93 wt % to 99 wt %, or 95 wt % to 99 wt % based on the fluorine-based binder. When the first structural unit is included within the above range, the fluorine-based binder may secure improved adhesive force and impregnation of an electrolyte.

The second structural unit may be included in an amount of greater than 0 wt % and less than or equal to 10 wt %, within the range, 0.5 wt % to 10 wt %, 1 wt % to 10 wt %, 1 wt % to 9 wt %, 2 wt % to 7 wt %, or 4 wt % to 6 wt % based on the fluorine-based binder. When the second structural unit is included within the above range, the fluorine-based binder may exhibit improved solubility in a low boiling point solvent, secure chemical stability, and exhibit improved adhesive force. Accordingly, since the coating layer is be formed using a low boiling point solvent without a separate additional process, a decrease in air permeability that may inevitably occur due to a use of a high boiling point solvent may be prevented.

The low boiling point solvent may be, for example, a solvent having a boiling point of less than or equal to about 80° C., and may be, for example, acetone, methyl ethyl ketone, ethyl isobutyl ketone, tetrahydrofuran, dimethyl formaldehyde, cyclohexane, or a mixed solvent thereof, but is not limited thereto. For example, the fluorine-based binder may have a solubility of less than or equal to about 20 at 40° C. in a solvent having a boiling point of less than or equal to 80° C.

The fluorine-based binder may further include a third structural unit derived from a monomer having at least one hydroxy group. The fluorine-based binder further including the third structural unit may exhibit improved adhesive force.

The third structural unit may be included in an amount of less than or equal to 10 wt %, for example 0.5 wt % to 7 wt %, 0.5 wt % to 5 wt %, or 1 wt % to 3 wt % based on the fluorine-based binder. When the third structural unit is included within the above range, the fluorine-based binder may exhibit improved adhesive force, and the coating layer 30 including the third structural unit may exhibit improved adhesive force, durability, and air permeability.

In an embodiment, when the fluorine-based binder further includes the third structural unit, the first structural unit may be included in an amount of 80 wt % to 99 wt %, the second structural unit may be included in an amount of 0.5 wt % to 10 wt %, and the third structural unit may be included in an amount of 0.5 wt % to 10 wt % based on the fluorine-based binder.

The monomer having at least one hydroxy group may be specifically, for example, a monomer including at least one hydroxy group and at least one carbon-carbon double bond. For example, the monomer having at least one hydroxy group may be a monomer having a hydroxy group and an acrylic group, and may be, for example, (meth)acrylic acid or a derivative of (meth)acrylate having a hydroxy group. As another example, the monomer having at least one hydroxy group may be a monomer having two or more carboxyl groups and a carbon-carbon double bond, and may be for example, itaconic acid or a derivative thereof, or maleic acid or a derivative thereof. As another example, the monomer having at least one hydroxy group may be a monomer having a hydroxy group and an allyl group, and may be, for example, a hydroxyalkane allyl ether. In addition, the monomer having at least one hydroxy group may be a monomer having a phosphoric acid group and a (meth)acrylic group, or a monomer having a sulfuric acid group and a (meth) acrylic group.

The (meth)acrylic acid refers to acrylic acid or methacrylic acid, and may be (meth)acrylic acid which is substituted with a halogen element, such as trichloroacrylic acid, and the (meth)acrylate refers to acrylate or methacrylate.

The derivative of (meth)acrylate having the hydroxy group may be, for example, hydroxyalkyl (meth)acrylate, carboxylalkyl (meth)acrylate, (meth)acryloyloxy alkylsuccinic acid, (meth)acryloyloxy alkylphthalic acid, (meth) acryloxyalkoxy hydroxybenzophenone, hydroxyphenoxyalkyl (meth)acrylate, glycerol mono(meth)acrylate, polyalkylene glycol mono(meth)acrylate, or hydroxyalkyl (meth)acrylamide.

Here, the alkyl may be C1 to C30 alkyl, for example, C1 to C20 alkyl, C1 to C10 alkyl, or C1 to C5 alkyl. The alkylene may be, for example, C1 to C30 alkylene, C1 to C20 alkylene, C1 to C10 alkylene, or C1 to C5 alkylene. The alkoxy may be C1 to C30 alkoxy, for example, C1 to C20 alkoxy, C1 to C10 alkoxy, or C1 to C5 alkoxy. The aryl may be, for example, C6 to C30 aryl, C6 to C20 aryl, or C6 to C10 aryl.

The hydroxyalkyl (meth)acrylate may be, for example, hydroxymethyl (meth)acrylate, hydroxyethyl (meth)acrylate, hydroxypropyl (meth)acrylate, hydroxybutyl (meth) acrylate, hydroxypentyl (meth)acrylate, hydroxyhexyl (meth)acrylate, and the like, and its chain may be substituted with a halogen element.

The carboxylalkyl (meth)acrylate may be for example carboxylmethyl (meth)acrylate, carboxylethyl (meth)acrylate, carboxylpropyl (meth)acrylate, carboxylbutyl (meth) acrylate, carboxylpentyl (meth)acrylate, carboxylhexyl (meth)acrylate, and the like.

The (meth)acryloyloxy alkyl succinic acid may be, for example, (meth)acryloyloxy methylsuccinic acid, (meth) acryloyloxy ethylsuccinic acid, (meth)acryloyloxy propylsuccinic acid, and the like, and the (meth)acryloyloxy alkylphthalic acid may be, for example, (meth)acryloyloxy methylphthalic acid, (meth)acryloyloxy ethylphthalic acid, (meth)acryloyloxy propylphthalic acid, and the like.

The (meth)acryloxyalkoxy hydroxybenzophenone may be, for example, 4-(2-acryloxyethoxy)-2-hydroxybenzophenone.

The polyalkylene glycol mono(meth)acrylate may be, for example, polyethylene glycol monomethacrylate, and the hydroxyalkyl (meth)acrylamide may be, for example, N-(2-hydroxypropyl)methacrylamide.

The monomer having at least one hydroxy group may be, for example, a monomer having two or more carboxyl groups such as itaconic acid and maleic acid. In this case, the monomer may be a derivative thereof or an anhydride form. Examples of anhydrides of the maleic acid derivative may include 3-methyl-2,5-furandione, 3-ethyl-2,5-furandione, 3-propyl-2,5-furandione, and 3-butyl-2,5-furandione, 3-pentyl-2,5-furandione, 3-hexyl-2,5-furandione, 3-heptyl-2,5-furandione, 3-octyl-2,5-furandione, and the like.

The monomer having at least one hydroxy group may be, for example, a monomer including a hydroxy group and an allyl group, and may be, for example, a hydroxyalkane allyl ether, and specifically, hydroxyalkane monoallyl ether, hydroxyalkane diallyl ether, or hydroxypolyalkoxy allyl ether. As another example, the monomer having at least one hydroxy group may be a monomer having a phosphoric acid group and an acrylic group such as monoacryloxyethyl phosphate, bis(2-methacryloxyethyl) phosphate, or a monomer having a sulfuric acid group and an acrylic group such as 2-sulfoethyl methacrylate, 3-sulfopropyl methacrylate, and the like.

When the fluorine-based binder further includes a third structural unit, the second structural unit may be included in the same amount as or in a greater amount than the third structural unit. For example, the copolymer may include the second structural unit and the third structural unit in a weight ratio of, for example, about 1:1 to 4:1, or 2:1 to 4:1, and in this case, adhesive force and air permeability of the coating layer may be improved.

The fluorine-based binder may be prepared by various known methods such as emulsion polymerization, suspension polymerization, massive polymerization, solution polymerization, or bulk polymerization, and for example, it may be prepared by suspension polymerization or emulsion polymerization.

The fluorine-based binder includes a first fluorine-based binder and a second fluorine-based binder having different weight average molecular weights. The weight average molecular weight of the first fluorine-based binder may be 800,000 to 1,500,000, and within the above range, 800,000 to 1,300,000, or 900,000 to 1,200,000. When the first fluorine-based binder has a weight average molecular weight within the above range, adhesive force may be improved. The weight average molecular weight may be polystyrene-reduced average molecular weight measured by gel permeation chromatography.

The first fluorine-based binder may have a crystallinity of 35% to 45%, for example, 38% to 45% or 40% to 45%. In this case, the first fluorine-based binder may exhibit improved adhesive force. The crystallinity of the first fluorine-based binder is higher than that of the second fluorine-based binder.

The second fluorine-based binder may have a weight average molecular weight of less than or equal to 600,000, within the range, greater than or equal to 500, greater than or equal to 1,000, greater than or equal to 10,000, or greater than or equal to 100,000, and less than or equal to 550,000 or less than or equal to 500,000. The second fluorine-based binder may have a weight average molecular weight of, for example greater than or equal to 100,000 and less than 600,000, or greater than or equal to 200,000 and less than 600,000, or 300,000 to 500,000, or 3500,000 to 500,000. When the second fluorine-based binder has a weight average molecular weight within the above range, the coating layer 30 including the second fluorine-based binder may exhibit improved wet adhesive force and dry adhesive force. The weight average molecular weight may be polystyrene-reduced average molecular weight measured by gel permeation chromatography.

The second fluorine-based binder may have a crystallinity of 35% to 45%, for example, 35% to 40% or 35% to 37%. When the second fluorine-based binder has a crystallinity within the above range, the coating layer 30 including the second fluorine-based binder may exhibit improved dry adhesive force. The crystallinity of the second fluorine-based binder may be lower than that of the first fluorine-based binder, and a difference in crystallinity between the first fluorine-based binder and the second fluorine-based binder may be 3% to 10%. In addition, the second fluorine-based binder may be a polymer having more branched chains than the first fluorine-based binder.

The first fluorine-based binder may be, for example, in an amount of 10 wt % to 50 wt %, for example 10 wt % to 40 wt %, 20 wt % to 50 wt % or 20 wt % to 40 wt % based on a total amount of the first fluorine-based binder and the second fluorine-based binder. In addition, the second fluorine-based binder may be, for example, in an amount of 50 wt % to 90 wt %, for example 50 wt % to 80 wt %, 60 wt % to 90 wt %, or 60 wt % to 80 wt % based on a total amount of the first fluorine-based binder and the second fluorine-based binder. When the first fluorine-based binder and the second fluorine-based binder are included within the above ranges, wet adhesive force and dry adhesive force of the separator 10 for the rechargeable battery may be simultaneously improved.

The binder may further include a (meth)acryl-based binder having a pencil hardness of 5H or more, for example, 6H or more, together with the fluorine-based binder, to improve heat resistance, adhesive force, and heat shrinkage of the separator 10.

The (meth)acryl-based binder includes a structural unit derived from a monomer having a (meth)acrylate group or a (meth)acrylic acid group. The (meth)acryl-based binder may include a urethane backbone and/or an aromatic hydrocarbon (e.g., C6 to C30 arylene or C6 to C30 heteroarylene) backbone. Herein, heteroarylene means to include a heteroatom such as N, O, S, P, or Si instead of carbon of the arylene. The monomer having the (meth)acrylate group or (meth)acrylic acid group may have 5 or more, for example, 6 or more, 7 or more, or 10 or more (meth)acrylate groups or (meth)acrylic acid groups. The (meth)acryl-based binder serves to fix the filler on the porous substrate 20, and at the same time, may provide an adhesive force so that the coating layer 30 adheres well to the porous substrate 20 and the electrode, and may contribute to the improvement of heat resistance, air permeability, and oxidation resistance of the separator 10.

In the structural unit derived from a monomer having the (meth)acrylate group or (meth)acrylic acid group, the (meth)acrylate group may be a conjugate base of (meth)acrylic acid, (meth)acrylate, or a derivative thereof.

For example, the structural unit derived from the monomer having the (meth)acrylate group or the (meth)acrylic acid group may be included in an amount of 10 mol % to 70 mol %, for example 20 mol % to 60 mol %, for example 30 mol % to 60 mol %, for example 40 mol % to 55 mol % based on a total amount of the (meth)acryl-based binder. When the structural unit derived from the monomer having the (meth)acrylate group or the (meth)acrylic acid group is included within the above range, the (meth)acryl-based binder provides a separator 10 having improved adhesive force, heat resistance, air permeability, and oxidation resistance.

The (meth)acryl-based binder may be prepared by various known methods such as emulsion polymerization, suspension polymerization, bulk polymerization, solution polymerization or bulk polymerization, and as an example, it may be prepared by suspension polymerization or emulsion polymerization.

The (meth)acryl-based binder may have a weight average molecular weight of in the range of 1,500 to 30,000, for example, 1,800 to 25,000 or 1,800 to 20,000. When the (meth)acryl-based binder has a weight average molecular weight within the above range, the coating layer 30 including the (meth)acryl-based binder may have improved heat resistance. The weight average molecular weight may be polystyrene-reduced average molecular weight measured by gel permeation chromatography.

The fluorine-based binder may be included in an amount of greater than or equal to 55 wt %, greater than or equal to 60 wt %, or greater than or equal to 65 wt % and less than or equal to 80 wt %, less than or equal to 75 wt %, or less than or equal to 70 wt % based on the total amount of the fluorine-based binder and the (meth)acryl-based binder. In addition, the (meth)acryl-based binder may be included in an amount of greater than or equal to 20 wt %, greater than or equal to 25 wt %, or greater than or equal to 30 wt % and less than or equal to 35 wt %, less than or equal to 40 wt %, or less than or equal to 45 wt % based on the total amount of the fluorine-based binder and the (meth)acryl-based binder. When the fluorine-based binder and the (meth) acrylic-based binder are included within the above range, not only the wet adhesive force and dry adhesive force of the separator 10 for the rechargeable battery may be improved, but also the heat shrinkage may be significantly reduced.

The binder may be included in an amount of less than or equal to 25 wt %, for example less than or equal to 20 wt %, less than or equal to 15 wt %, or less than or equal to 10 wt % and greater than or equal to 1 wt %, for example greater than or equal to 2 wt %, greater than or equal to 3 wt %, greater than or equal to 4 wt %, or greater than or equal to 5 wt % based on a total amount of the coating layer 30. As described above, by using the fluorine-based binder and the (meth)acryl-based binder together while reducing the amount of the binder, the separator 10 for the rechargeable battery having improved adhesive force may be provided.

The coating layer 30 may improve heat resistance by including the filler and may prevent abrupt shrinkage or deformation of a separator due to increase of a temperature. The filler may be for example an inorganic filler, an organic filler, an organic/inorganic filler, or a combination thereof. The inorganic filler may be a ceramic material capable of improving heat resistance, for example a metal oxide, a semi-metal oxide, a metal fluoride, a metal hydroxide, or a combination thereof. The inorganic filler may be for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto. The organic filler may include an acrylic compound, an imide compound, an amide compound, or a combination thereof, but is not limited thereto. The organic filler may have a core-shell structure, but is not limited thereto.

The filler may have a spherical shape, a sheet shape, a cubic shape, or an amorphous shape. An average particle diameter of the filler may range from about 1 nm to 2500 nm, within the range, about 100 nm to 2000 nm, or 100 nm to 1000 nm, for example about 300 nm to 800 nm. The average particle diameter of the filler may be particle size ($D_{50}$) at a volume ratio of 50% in a cumulative size-distribution curve. By using the filler having an average particle diameter within the above range, an appropriate strength may be imparted to the coating layer 30. The filler may be used by mixing two or more different types of fillers or two or more fillers having different sizes.

The filler may be included in an amount of greater than or equal to 75 wt %, for example greater than or equal to 80 wt %, greater than or equal to 85 wt %, or greater than or equal to 90 wt % and less than or equal to 99 wt %, for example less than or equal to 95 wt %, less than or equal to 96 wt %, less than or equal to 97 wt %, or less than or equal to 98 wt % based on a total amount of the coating layer 30. When the filler is included within the ranges, the separator 10 for a rechargeable battery according to an embodiment may have improved heat resistance, durability, and stability.

The separator 10 for the rechargeable battery according to an embodiment may exhibit improved heat resistance, stability, wet adhesive force, dry adhesive force, and heat shrinkage by including the coating layer 30 including the aforementioned binder and filler.

The coating layer 30 may further include one or two or more additional binders in addition to the binders. The additional binder may include a crosslinked binder or a non-crosslinked binder.

The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, an epoxy group, an oxetane group, an ether group, a cyanate group, an isocyanate group, a hydroxy group, a carboxyl group, a thiol group, an amino group, an alkoxy group, or a combination thereof, but is not limited thereto.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The non-crosslinked binder may be for example polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The coating layer 30 may have a thickness of about 0.01 µm to 20 µm, within the range, about 1 µm to 10 µm or about 1 µm to 5 µm.

The separator 10 for rechargeable battery may be manufactured by known various methods. For example, the separator 10 for a rechargeable battery may be formed by coating a composition for forming a coating layer and drying and curing the same on one surface or both surfaces of the porous substrate 20. The composition for forming the coating layer may include the first fluorine-based binder, the second fluorine-based binder, the (meth)acryl-based binder, the filler, and a solvent.

The solvent is not particularly limited as long as it can dissolve or disperse the first fluorine-based binder, the second fluorine-based binder, the (meth)acryl-based binder, and the filler. The solvent may be, for example, a low boiling point solvent having a boiling point of less than or equal to 80° C., and may be, for example, acetone, methyl ethyl ketone, ethyl isobutyl ketone, tetrahydrofuran, dimethylformaldehyde, cyclohexane, or a mixed solvent thereof, but is not limited thereto.

The coating may be, for example spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of 25° C. to 120° C.

The separator 10 for a rechargeable battery may be manufactured by lamination, coextrusion, and the like in addition to the above method.

Hereinafter, a rechargeable lithium battery including the separator for a rechargeable battery is described.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for these batteries are well known in the art pertaining in this field.

Figure 2:
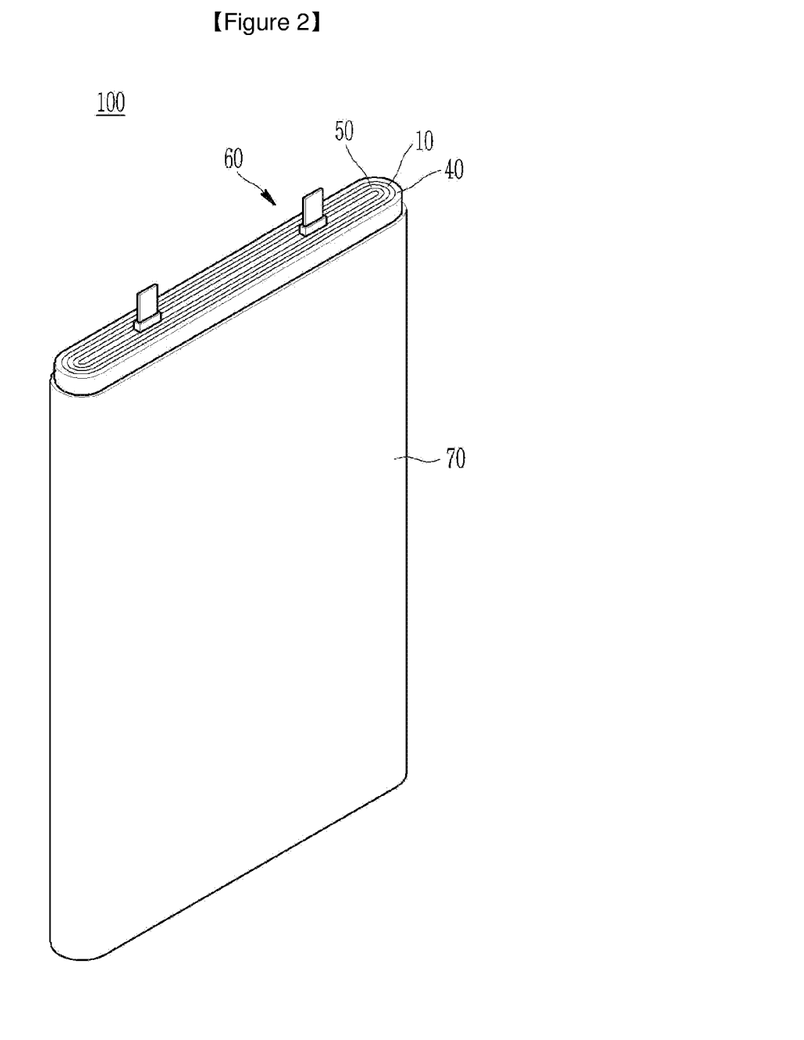
FIG. 2 is an exploded perspective view showing a rechargeable lithium battery according to an embodiment.

Herein, as an example of a rechargeable lithium battery, a prismatic rechargeable lithium battery is for example described. FIG. 2 is an exploded perspective view showing a rechargeable lithium battery according to an embodiment. Referring to FIG. 2, a rechargeable lithium battery 100 according to one embodiment includes an electrode assembly 60 manufactured by disposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 disposed therebetween.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shaped, flake-shaped, spherically shaped, or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 50 may be the same as the binder and conductive material of the positive electrode.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. The organic solvent may for example be a carbonate-based solvent, an ester-based solvent, an ether-based solvent, a ketone-based solvent, an alcohol-based solvent, or an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

DETAILED DESCRIPTION OF THE EMBODIMENTS

Hereinafter, the above aspects of the present disclosure are illustrated in more detail with reference to examples. However, these examples are exemplary, and the present disclosure is not limited thereto.

Examples and Comparative Examples: Manufacture of Separator and Electrode Assembly

Example 1

(1) Manufacture of Separator

A first fluorine-based binder having a weight average molecular weight of 1,120,000, which was prepared by suspension-polymerizing 93.5 wt % of vinylidene fluoride, 5 wt % of hexafluoropropylene, and 1.5 wt % of acrylic acid, a second fluorine-based binder having a weight average molecular weight of 450,000, which was prepared by emulsion-polymerizing 95 wt % of vinylidene fluoride and 5 wt % of hexafluoropropylene, and a (meth)acryl-based binder having pencil hardness of 6H (a weight average molecular weight: 20,000, SC2152, Miwon Specialty Chemical Co., Ltd.) in a weight ratio of 30:30:40 were mixed in an acetone solvent to prepare a binder solution.

The binder solution and an alumina filler (ASES-11, Sumitomo Chemical Co., Ltd.) in a weight ratio of 1:3 were mixed in an acetone solvent to prepare a composition for forming a coating layer.

The composition for forming the coating layer was dip-coated to be respectively 1.5 μm thick (3 μm thick in total) on both surfaces of a 12 μm-thick polyethylene substrate and then, dried at 60° C. for several seconds to manufacture a separator for a rechargeable battery.

(2) Manufacture of Electrode Assembly $LiCoO_2$, polyvinylidene fluoride, and carbon black in a weight ratio of 96:2:2 were added to an N-methylpyrrolidone solvent to prepare slurry. The slurry was coated on an aluminum thin film and then, dried and compressed to manufacture a positive electrode.

Graphite, polyvinylidene fluoride, and carbon black in a weight ratio of 98:1:1 were added to an N-methylpyrrolidone solvent to prepare slurry. The slurry was coated on a copper foil and then, dried and compressed to manufacture a negative electrode.

Between the positive and negative electrodes, the separator was disposed to manufacture a monocell-type (separator/negative electrode/separator/positive electrode stacked) electrode assembly.

Example 2

A separator for rechargeable battery and an electrode assembly were manufactured according to the same method as Example 1 except that a polymer having pencil hardness of 5H (a weight average molecular weight: 1800, PU5000, Miwon Specialty Chemical Co., Ltd.) was used as the (meth)acryl-based binder.

Example 3

A separator for rechargeable battery and an electrode assembly were manufactured according to the same method as Example 1 except that a polymer having pencil hardness of 6H (a weight average molecular weight: 3900, SC2153, Miwon Specialty Chemical Co., Ltd.) was used as the (meth)acryl-based binder.

Comparative Example 1

A separator for rechargeable battery and an electrode assembly were manufactured according to the same method as Example 1 except that a polymer having pencil hardness of 3B (a weight average molecular weight: 4800, PU2510, Miwon Specialty Chemical Co., Ltd.) was used as the (meth)acryl-based binder.

Comparative Example 2

A separator for rechargeable battery and an electrode assembly were manufactured according to the same method as Example 1 except that the (meth)acryl-based binder was not used.

Evaluation Example 1: Heat Shrinkage Rate

The separators according to Examples 1 to 3 and Comparative Examples 1 and 2 were respectively cut into a size of 8 cm×8 cm to prepare samples. On the surfaces of the samples, after drawing a 5 cm×5 cm quadrangle, each sample was inserted between papers and allowed to stand at 150° C. in an oven for 1 hour and taken out therefrom to measure the sides of the quadrangle drawn thereon and calculate each shrinkage rate in the horizontal direction (MD) and the vertical direction (TD). The results are shown in Table 1.

Evaluation Example 2: Adhesive Force Evaluation

The monocells according to Examples 1 to 3 and Comparative Examples 1 and 2 were cut into a width of 15 mm and a length of 60 mm to obtain samples. The separator and the negative electrode of each sample were separated, a releasing paper was adhered to the end of the separator adhered to the positive electrode with a tape, and after separating the separator to which the releasing paper was adhered about 15 mm apart from the positive electrode, the positive electrode was fixed into a lower grip, while the releasing paper side adhered to the separator was fixed into an upper grip with an interval between the grips 60 mm, and then, elongated and peeled in an 180° direction. Herein, the peeling speed was 20 mm/min, and a force required for 40 mm peeling was three times measured and averaged. The peel strength measurement results are shown in Table 1.

TABLE 1

| | Pencil hardness of (meth)acryl-based binder | Heat shrinkage rate | | Adhesive force (gf/mm) |
|---|---|---|---|---|
| | | MD (%) | TD (%) | |
| Example 1 | 6H | 8 | 9 | 1.5 |
| Example 2 | 5H | 11 | 13 | 1.8 |
| Example 3 | 6H | 7 | 7 | 1.6 |
| Comparative Example 1 | 3B | 45 | 50 | 2.4 |
| Comparative Example 2 | — | 45 | 57 | 0.7 |

Referring to Table 1, the separators using a (meth)acryl-based binder having pencil hardness of 5H or higher according to Examples 1 to 3 exhibited a low thermal shrinkage rate and an improved adhesive force. On the contrary, the separator using the (meth)acryl-based binder having pencil hardness of 3B according to Comparative Example 1 and the separator using no (meth)acryl-based binder according to Comparative Example 2 exhibited a very high thermal shrinkage rate, and the separator using no (meth)acryl-based binder according to Comparative Example 2 exhibited a low adhesive force.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A separator for rechargeable battery, comprising:
a porous substrate; and
a coating layer on at least one surface of the porous substrate, wherein the coating layer includes a filler and a binder including a fluorine-based binder and a (meth)acryl-based binder,
wherein the fluorine-based binder includes a first fluorine-based binder having a weight average molecular weight of 800,000 to 1,500,000 and a second fluorine-based binder having a weight average molecular weight of less than or equal to 600,000,
wherein each of the first fluorine-based binder and the second fluorine-based binder includes a first structural unit derived from vinylidene fluoride and a second structural unit derived from at least one monomer of hexafluoropropylene, chlorotrifluoroethylene, trifluoroethylene, ethylene tetrafluoride, and ethylene monomers, and the second structural unit is included in an amount of 10 wt % or less with respect to the fluorine-based binder, and
wherein the (meth)acryl-based binder has pencil hardness of 5H or higher.

2. The separator of claim 1, wherein the first fluorine-based binder further includes a third structural unit derived from a monomer having at least one hydroxy group.

3. The separator of claim 2, wherein the monomer having at least one hydroxy group is at least one selected from (meth)acrylic acid, a derivative of (meth)acrylate having a hydroxy group, itaconic acid, or a derivative thereof, maleic acid or a derivative thereof and hydroxyalkane allyl ether.

4. The separator of claim 2, wherein the third structural unit is included in an amount of 0.5 wt % to 7 wt % with respect to the first fluorine-based binder.

5. The separator of claim 1, wherein the first fluorine-based binder is included in an amount of 10 wt % to 50 wt % with respect to a total amount of the first fluorine-based binder and the second fluorine-based binder and the second fluorine-based binder is included in an amount of 50 wt % to 90 wt % with respect to the total amount of the first fluorine-based binder and the second fluorine-based binder.

6. The separator of claim 1, wherein the (meth)acryl-based binder includes a structural unit derived from a monomer having a (meth)acrylate group or a (meth)acrylic acid group.

7. The separator of claim 1, wherein the fluorine-based binder is included in an amount of greater than or equal to 55 wt % with respect to a total amount of the fluorine-based binder and the (meth)acryl-based binder.

8. The separator of claim 1, wherein the filler is included in an amount of 75 wt % to 99 wt % with respect to the coating layer.

9. The separator of claim 1, wherein the filler comprises $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof.

10. A rechargeable lithium battery, comprising:
a positive electrode;
a negative electrode; and
a separator between the positive electrode and the negative electrode, the separator comprising:
a porous substrate; and
a coating layer on at least one surface of the porous substrate, wherein the coating layer includes a filler and a binder including a fluorine-based binder and a (meth)acryl-based binder,
wherein the fluorine-based binder includes a first fluorine-based binder having a weight average molecular weight of 800,000 to 1,500,000 and a second fluorine-based binder having a weight average molecular weight of less than or equal to 600,000,
wherein each of the first fluorine-based binder and the second fluorine-based binder includes a first structural unit derived from vinylidene fluoride and a second structural unit derived from at least one monomer of hexafluoropropylene, chlorotrifluoroethylene, trifluoroethylene, ethylene tetrafluoride, and ethylene monomers, and the second structural unit is included in an amount of 10 wt % or less with respect to the fluorine-based binder, and
wherein the (meth)acryl-based binder has pencil hardness of 5H or higher.

11. The separator of claim 1, wherein the fluorine-based binder has a solubility of less than or equal to about 20 at 40° C. in a solvent having a boiling point of less than or equal to 80° C.

12. The separator of claim 1, wherein the first fluorine-based binder has a crystallinity of 35% to 45%.

13. The separator of claim 1, wherein the second fluorine-based binder has a crystallinity of 35% to 45%.

14. The separator of claim 1, wherein the first structural unit is included in an amount of 90 wt % to 99.5 wt %.

15. The separator of claim 1, wherein the second structural unit is included in an amount of greater than 0 wt % and less than or equal to 10 wt %.

16. The separator of claim 1, wherein the fluorine-based binder further includes a third structural unit such that the second structural unit is included in the same amount as or in a greater amount than the third structural unit.

17. The separator of claim 16, wherein the third structural unit is included in an amount of less than or equal to 10 wt %.

18. The separator of claim 16, wherein the second structural unit and the third structural unit are in a weight ratio of 1:1 to 4:1 or 2:1 to 4:1.

19. The separator of claim 1, wherein the (meth)acryl-based binder have a weight average molecular weight of in the range of 1,500 to 30,000.

20. The separator of claim 6, wherein the (meth)acryl-based binder includes 5 or more (meth)acrylate groups or (meth)acrylic acid groups.

* * * * *